United States Patent
Majewski et al.

(10) Patent No.: US 12,541,915 B2
(45) Date of Patent: Feb. 3, 2026

(54) SYSTEM AND METHOD FOR EXTRACTING AN OBJECT OF INTEREST FROM A 3D POINT CLOUD

(71) Applicant: APPLICATIONS MOBILES OVERVIEW INC., Montreal (CA)

(72) Inventors: Yann Majewski, Montreal (CA); Sherif Esmat Omar Abuelwafa, Montreal (CA); Wrushabh Warshe, Montreal (CA); Laurent Juppe, Montreal (CA); Bryan Martin, Montreal (CA)

(73) Assignee: APPLICATIONS MOBILES OVERVIEW INC., Montreal (CA)

( * ) Notice: Subject to any disclaimer, the term of this patent is extended or adjusted under 35 U.S.C. 154(b) by 163 days.

(21) Appl. No.: 18/144,061

(22) Filed: May 5, 2023

(65) Prior Publication Data
US 2023/0360322 A1 Nov. 9, 2023

(30) Foreign Application Priority Data

May 6, 2022 (EP) .................................... 22172109

(51) Int. Cl.
*G06T 17/00* (2006.01)
*G06T 5/70* (2024.01)

(52) U.S. Cl.
CPC ................ *G06T 17/00* (2013.01); *G06T 5/70* (2024.01); *G06T 2207/10028* (2013.01); *G06T 2207/20024* (2013.01)

(58) Field of Classification Search
CPC ............. G06T 17/00; G06T 5/70; G06T 5/50; G06T 2207/10028; G06T 2207/20024; G06T 2200/04; G06T 7/55
(Continued)

(56) References Cited

U.S. PATENT DOCUMENTS 10,074,160 B2 9/2018 Kim et al.
12,112,519 B1 * 10/2024 Polichroniadis ..... G06V 10/761
(Continued)

FOREIGN PATENT DOCUMENTS

EP 3016077 A1 5/2016

OTHER PUBLICATIONS

European Search Report with regard to the counterpart EP Patent Application No. 22172109.5 completed Oct. 27, 2022.
(Continued)

*Primary Examiner* — Prabodh M Dharia
(74) *Attorney, Agent, or Firm* — BCF LLP

(57) ABSTRACT

The disclosed systems, structures, and methods are directed to generating data points in a 3D point cloud generated from a plurality of images of an object, each image having been captured by an imaging mobile device from a corresponding point of view. The method comprises identifying, for identified feature points of the object, a list of 3D coordinates, and a list of 2D coordinates, an entry of said list being 2D coordinates of a projection of the feature data point on the corresponding image. In response to determining that, for a given feature point, a number of images on which the corresponding projected 2D coordinates fall onto a pixel range of said images is above a pre-determined threshold, the given feature point is marked as a robust feature point. A median feature point is generated from the list of 3D coordinates of the robust feature point.

20 Claims, 9 Drawing Sheets

(58) Field of Classification Search
USPC .......................................................... 345/418
See application file for complete search history.

(56) References Cited

U.S. PATENT DOCUMENTS

| | | | |
|---|---|---|---|
| 2018/0018805 A1 | 1/2018 | Kutliroff et al. | |
| 2018/0075614 A1 | 3/2018 | He | |
| 2018/0211399 A1* | 7/2018 | Lee | G06T 7/529 |
| 2019/0188872 A1* | 6/2019 | Aflalo | G06T 7/593 |
| 2020/0126257 A1* | 4/2020 | Tauber | G06T 7/75 |
| 2020/0349731 A1* | 11/2020 | Ye | G06V 40/165 |
| 2021/0304396 A1* | 9/2021 | Addington | G01N 21/6456 |
| 2022/0237880 A1* | 7/2022 | Juppe | G06T 19/20 |
| 2022/0285009 A1* | 9/2022 | Sha | G06T 3/14 |

OTHER PUBLICATIONS

Berger et al., "State of the Art in Surface Reconstruction from Point Clouds", EUROGRAPHICS star report, 2014, retrieved from the Internet, URL:https://hal.inria.fr/docs/01/01/77/00/pdf/star_author.pdf, received with the European Search Report, p.p. 161-185.

* cited by examiner

|  | $D_1$ | $D_2$ | $D_3$ | $D_4$ |
|---|---|---|---|---|
| $I_1$ | $x_{11}, y_{11}, z_{11}\ (D_{11})$ | $x_{12}, y_{12}, z_{12}\ (D_{12})$ | $x_{13}, y_{13}, z_{13}\ (D_{13})$ | $x_{14}, y_{14}, z_{14}\ (D_{14})$ |
|  | $\tilde{x}_{11}, \tilde{y}_{11}\ (\tilde{D}_{11})$ | $\tilde{x}_{12}, \tilde{y}_{12}\ (\tilde{D}_{12})$ | $\tilde{x}_{13}, \tilde{y}_{13}\ (\tilde{D}_{13})$ | $\tilde{x}_{14}, \tilde{y}_{14}\ (\tilde{D}_{14})$ |
| $I_2$ | $x_{21}, y_{21}, z_{21}\ (D_{21})$ | $x_{22}, y_{22}, z_{22}\ (D_{22})$ | $x_{23}, y_{23}, z_{23}\ (D_{23})$ | $x_{24}, y_{24}, z_{24}\ (D_{24})$ |
|  | $\tilde{x}_{21}, \tilde{y}_{21}\ (\tilde{D}_{21})$ | $\tilde{x}_{22}, \tilde{y}_{22}\ (\tilde{D}_{22})$ | $\tilde{x}_{23}, \tilde{y}_{23}\ (\tilde{D}_{23})$ | $\tilde{x}_{24}, \tilde{y}_{24}\ (\tilde{D}_{24})$ |
| $I_3$ | $x_{31}, y_{31}, z_{31}\ (D_{31})$ | $x_{32}, y_{32}, z_{32}\ (D_{32})$ | $x_{33}, y_{33}, z_{33}\ (D_{33})$ | - |
|  | $\tilde{x}_{31}, \tilde{y}_{31}\ (\tilde{D}_{31})$ | $\tilde{x}_{32}, \tilde{y}_{32}\ (\tilde{D}_{32})$ | $\tilde{x}_{33}, \tilde{y}_{33}\ (\tilde{D}_{33})$ | - |

Figure 5

SYSTEM AND METHOD FOR EXTRACTING AN OBJECT OF INTEREST FROM A 3D POINT CLOUD

CROSS-REFERENCE TO RELATED APPLICATIONS

The present application claims priority to European Patent Application No. 22172109.5 titled "SYSTEM AND METHOD FOR EXTRACTING AN OBJECT OF INTEREST FROM A 3D POINT CLOUD", filed May 6, 2022, the entirety of which is incorporated by reference herein.

FIELD

The present technology relates to systems and methods of generating a 3D representation of a scene in the form of data points forming a 3D point cloud, and in particular to extracting data points associated with an object from said scene.

BACKGROUND

Three-dimensional ("3D") digital data may be produced by a variety of devices that involve three-dimensional scanning or sampling and/or numerical modeling. In one example, 3D laser scanners generate 3D digital data. A long range laser scanner is fixed in one location and rotated to scan objects around it. Alternatively, a short-range laser scanner is mounted on a device that moves around an object while scanning it. In any of the scenarios, the location of each point scanned is represented as a polar coordinate since the angle between the scanner and the object and distance from the scanner to the object are known. The polar coordinates are then converted to 3D Cartesian coordinates and stored along with a corresponding intensity or color value for the data point collected by the scanner.

Other examples of devices to generate 3D digital data are depth cameras or 3D scanners to generate 3D digital data by collecting a complete point set of (x, y, z) locations that represent the shape of an object. Once collected, these point sets, also known as 3D point clouds, are sent to an image rendering system, which then processes the point data to generate a 3D representation of the object.

Typical systems and methods to capture 3D point clouds and then generate a 3D representation of an object require specialized, cumbersome and costly hardware equipment. Moreover, 3D point clouds are usually generated based on information provided by mobile imaging devices that are moved around the object. A movement of such a device may cause, in combination with multiple computing steps to generate the 3D point cloud, a multiplicity of errors that accumulate. These errors cause alterations of the location of the data points in the 3D space and usually manifest as a trail of multiple points that were originally a single point of the object. In other words, a same point of the object is represented by two or more data points in the 3D point cloud. For example, FIG. 1A illustrates an object having a plurality of identified feature points $D_1$, $D_2$, $D_3$ and $D_4$. A 3D point cloud representing the object is illustrated on FIG. 1B. The drift effect causes the feature $D_1$ to be represented by a plurality of data points in the region 5, each data point being defined by a corresponding set of 3D coordinates. The same also applies to the other feature points. Only data points of the 3D point cloud representing the feature points $D_1$, $D_2$, $D_3$ and $D_4$ are depicted in FIG. 1B for clarity. The drift effect thus degrades the quality of the 3D point cloud. As such, there is an interest in developing cost effective systems and methods to generate 3D representation from 3D point clouds.

SUMMARY

Implementations of the present technology have been developed based on developers' appreciation of at least one technical problem associated with the prior art solutions.

For example, even though the prior art suggests techniques to generate 3D point clouds, such techniques often require specialized, cumbersome and costly hardware equipment such as 3D laser scanners to produce a point cloud of sufficient quality to permit, e.g., generation of a 3D representation of an object. Even point clouds produced by such specialized hardware may still contain enough noise to cause difficulties in processing the point cloud. Additionally, it may be desirable to effectively filter out portions of a point cloud that are not related to an object of interest in the point cloud, such as a surface on which an object of interest is resting.

Additionally, it is now possible to use non-specialized hardware, such as a mobile device including a camera (e.g., an iPhone® mobile phone from Apple or a Galaxy® mobile phone or tablet from Samsung) to acquire a 3D point cloud. However, point clouds obtained from such non-specialized hardware may include even more noise than point clouds obtained using specialized 3D scanning hardware, making noise removal even more important.

In accordance with a first aspect of the present technology, there is provided a computer-implemented method for generating data points in a 3D point cloud from a plurality of images of an object. Each image has been captured by an imaging mobile device from a corresponding point of view, each image being associated with feature data, the feature data comprising information about 3D coordinates of the corresponding point of view in a global coordinate system, 3D coordinates of a set of feature points of the object in the global coordinate system, the features points of the object being represented by feature data points in the 3D point cloud, the feature data points being associated with identifiers such that at least one feature point is identified on at least two distinct images by at least two corresponding feature data points. The method comprises identifying, for each feature point of the object, a list of 3D coordinates, an entry of said list being 3D coordinates indicative of a position of a corresponding feature data point in the global coordinate system for a corresponding image, generating, for each feature point of the object, a list of 2D coordinates, an entry of said list being 2D coordinates of a projection of the feature data point on the corresponding image, in response to determining that, for a given feature point, a number of images on which the corresponding projected 2D coordinates fall onto a pixel range of said images is above a pre-determined threshold, marking the given feature point as a robust feature point and generating, for each robust feature point, a median feature point from the list of 3D coordinates of the robust feature point, a plurality of median feature points thereby forming new data points in the 3D point cloud.

In some implementations, the plurality of images is a plurality of colored images, the feature data of a given image further comprises information about colors of the feature data points in a color space, and identifying, for each feature point of the object, a list of 3D coordinates comprises identifying, for each feature point of the object, a list of colors, an entry of said list being color coordinates in the color space of the feature point for a given colored image.

In some implementations, the color space is the Red-Green-Blue (RGB) space.

In some implementations, a median feature point is colored with an average of colors of the corresponding list of colors.

In some implementations, the pre-determined threshold is based on a number of images in the plurality of images, a frame rate of the imaging mobile device, and/or a density of the feature points in the global coordinate system.

In some implementations, the feature points of the object are determined based on augmented reality techniques.

In some implementations, generating, for each feature point of the object, a list of 2D coordinates comprises applying a transfer function to the 3D coordinates corresponding to said feature point for each image, the transfer function being based on extrinsic or intrinsic parameters of the imaging mobile device In accordance with a second aspect of the present technology, there is provided a computer-implemented system configured to perform the computer-implemented method.

In accordance with a third aspect of the present technology, there is provided a non-transitory computer-readable medium comprising computer-executable instructions that cause a system to execute the method.

In accordance with a fourth aspect of the present technology, there is provided a computer-implemented method for removing noise from a 3D point cloud, the 3D point cloud being a representation of an object in a global coordinate system, the 3D point cloud having been generated from a plurality of images of the object, each image having been captured by an imaging mobile device from a corresponding point of view. The method comprises accessing the 3D point cloud, the 3D point cloud comprising feature data points associated with identifiers, a plurality of feature data points having a same identifier corresponding to a same feature point of the object at different locations in the global coordinate system, generating median feature points according to the aforementioned method, discarding the feature data points from the 3D point cloud, and applying a first de-noising phase to the 3D point cloud. The first de-noising phase comprises segmenting the 3D point cloud into regions, merging regions into clusters, and optimizing the clusters by removing points that are statistical outliers to a cluster from the 3D point cloud. The method further comprises applying a second de-noising phase to the 3D point cloud, the second de-noising phase identifying a planar surface in the 3D point cloud and removing points associated with the planar surface from the 3D point cloud, the planar surface being perpendicular to a reference axis, and applying a third de-noising phase to the 3D point cloud, the third de-noising phase removing delocalized noise associated with the planar surface from the 3D point cloud.

In some implementations, the reference axis is a gravity-oriented axis.

In some implementations, removing points associated with the planar surface from the 3D point cloud comprises identifying points of the 3D point cloud having a corresponding normal vector forming an angle below a first pre-determined threshold with the reference axis, and removing said identified points.

In some implementations, the third de-noising phase uses color-based filtering to remove delocalized noise associated with the planar surface.

In some implementations, the color-based filtering removes data points from the 3D point cloud having distance between their color coordinates and color coordinates of an average color of the points associated with the planar surface below a second threshold.

In some implementations, the second threshold is based on variation of color along the planar surface.

In a further aspect of the technology, a non-transitory computer-readable medium including computer-executable instructions that cause a system to execute any of the above implementations of the method is provided.

BRIEF DESCRIPTION OF THE DRAWINGS

These and other features, aspects and advantages of the present technology will be better understood with regard to the following description, appended claims and accompanying drawings where:

FIG. 5 is a chart including information about lists of sets of 2D and 3D coordinates of feature data points associated with the feature points of the object;

DETAILED DESCRIPTION

Figure 1A:
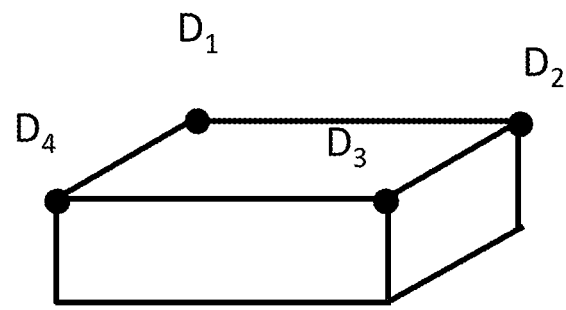
FIG. 1A is a perspective view of an object with associated feature points.
Figure 1B:
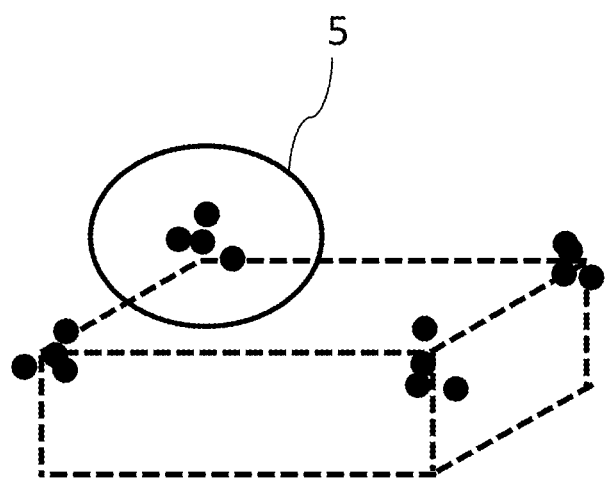
FIG. 1B is a representation of a 3D point cloud including data points representative of the feature points of the object, the 3D point cloud being affected with a drifting effect.

Various implementations of the described technology will be described more fully hereinafter with reference to the accompanying drawings. The present technology may, however, be embodied in many different forms and should not be construed as limited to the implementations set forth herein. Rather, these implementations are provided so that the disclosure will be thorough and complete, and will fully convey the scope of the disclosed technology to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is only intended to describe particular implementations and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any step diagrams, flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional step labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some implementations of the present technology, the processor may be a general purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

With these fundamentals in place, we will now consider some non-limiting examples to illustrate various implementations of aspects of the present technology.

Figure 2:
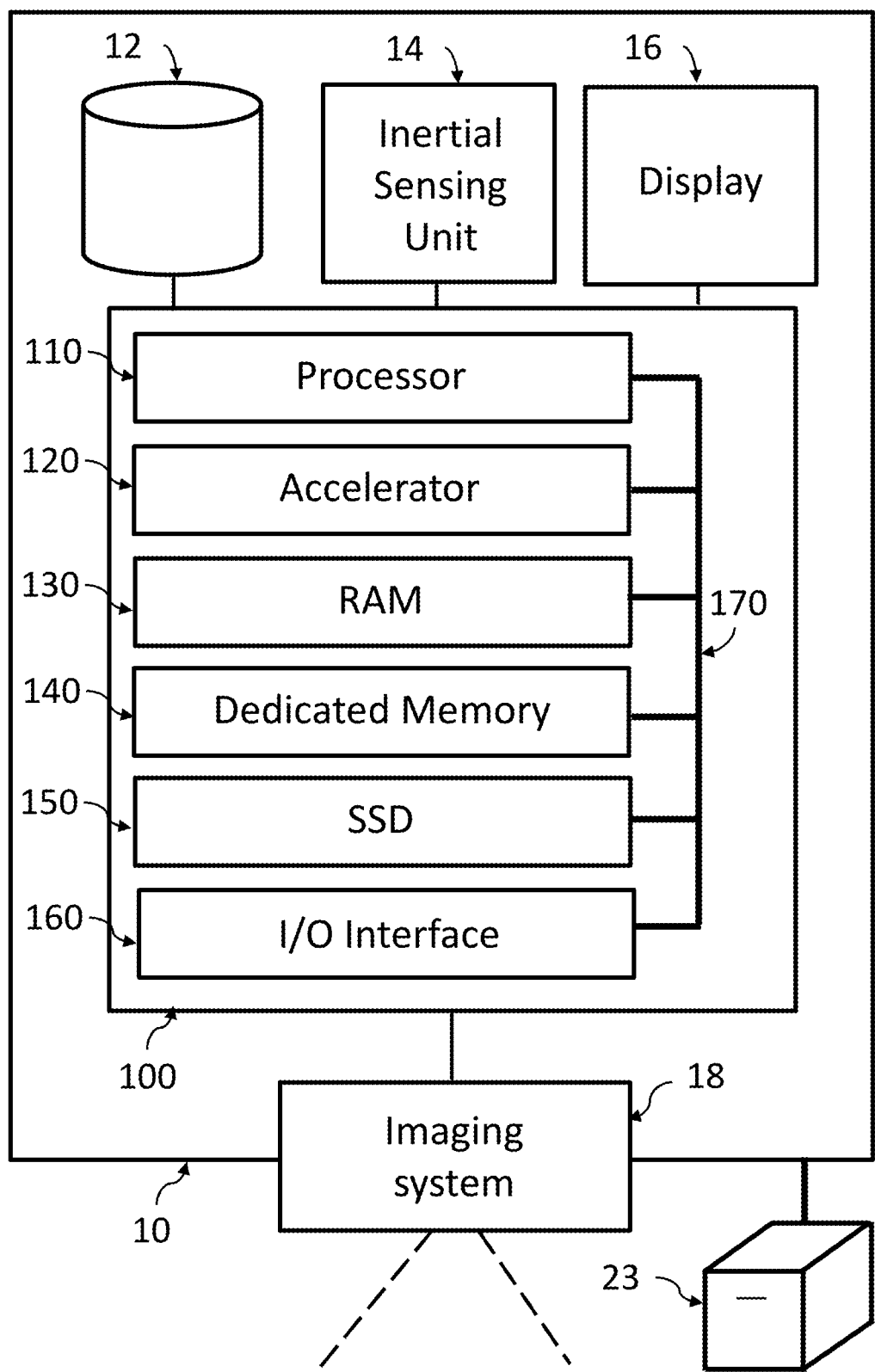
FIG. 2 is an illustration of an environment for executing a method of generating a 3D point cloud and removing noise therefrom according to an embodiment of the present technology.

With reference to FIG. 2, there is shown a device 10 suitable for use in accordance with at least some embodiments of the present technology. It is to be expressly understood that the device 10 as depicted is merely an illustrative implementation of the present technology. In some cases, what are believed to be helpful examples of modifications to the device 10 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition, it is to be understood that the device 10 may provide in certain instances simple implementations of the present technology, and that where such is the case they have been presented in this manner as an aid to understanding. As persons skilled in the art would understand, various implementations of the present technology may be of a greater complexity.

FIG. 2 is a schematic representation of a device 10 configured for generating and/or processing a three-dimensional (3D) point cloud in accordance with an embodiment of the present technology. The device 10 comprises a computing unit 100 that may receive captured images of an object to be characterized. The computing unit 100 may be configured to generate the 3D point cloud as a representation of the object to be characterized. The computing unit 100 is described in greater details hereinbelow.

In some embodiments, the computing unit 100 may be implemented by any of a conventional personal computer, a controller, and/or an electronic device (e.g., a server, a controller unit, a control device, a monitoring device etc.) and/or any combination thereof appropriate to the relevant task at hand. In some embodiments, the computing unit 100 comprises various hardware components including one or more single or multi-core processors collectively represented by a processor 110, a solid-state drive 150, a random access memory (RAM) 130, a dedicated memory 140 and an input/output interface 160. The computing unit 100 may be a computer specifically designed to operate a machine learning algorithm (MLA) and/or deep learning algorithms (DLA). The computing unit 100 may be a generic computer system.

In some other embodiments, the computing unit 100 may be an "off the shelf" generic computer system. In some embodiments, the computing unit 100 may also be distributed amongst multiple systems. The computing unit 100 may also be specifically dedicated to the implementation of the present technology. As a person in the art of the present technology may appreciate, multiple variations as to how the computing unit 100 is implemented may be envisioned without departing from the scope of the present technology.

Communication between the various components of the computing unit 100 may be enabled by one or more internal and/or external buses 170 (e.g. a PCI bus, universal serial bus, IEEE 1394 "Firewire" bus, SCSI bus, Serial-ATA bus, ARINC bus, etc.), to which the various hardware components are electronically coupled.

The input/output interface 160 may provide networking capabilities such as wired or wireless access. As an example, the input/output interface 160 may comprise a networking interface such as, but not limited to, one or more network ports, one or more network sockets, one or more network interface controllers and the like. Multiple examples of how the networking interface may be implemented will become apparent to the person skilled in the art of the present technology. For example, but without being limitative, the networking interface may implement specific physical layer and data link layer standard such as Ethernet, Fibre Channel, Wi-Fi or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 120 stores program instructions suitable for being loaded into the RAM 130 and executed by the processor 110. Although illustrated as a solid-state drive 150, any type of memory may be used in place of the solid-state drive 150, such as a hard disk, optical disk, and/or removable storage media. According to implementations of the present technology, the solid-state drive 120 stores program instructions suitable for being loaded into the RAM 130 and executed by the processor 110 for executing generation of 3D representation of objects. For example, the program instructions may be part of a library or an application.

The processor 110 may be a general-purpose processor, such as a central processing unit (CPU) or a processor dedicated to a specific purpose, such as a digital signal processor (DSP). In some embodiments, the processor 110 may also rely on an accelerator 120 dedicated to certain given tasks, such as executing the methods set forth in the paragraphs below. In some embodiments, the processor 110 or the accelerator 120 may be implemented as one or more field programmable gate arrays (FPGAs). Moreover, explicit use of the term "processor", should not be construed to refer exclusively to hardware capable of executing software, and may implicitly include, without limitation, application specific integrated circuit (ASIC), read-only memory (ROM) for storing software, RAM, and non-volatile storage. Other hardware, conventional and/or custom, may also be included.

The device 10 comprises an imaging system 18 that may be configured to capture Red-Green-Blue (RGB) images. As such, the device 10 may be referred to as the "imaging mobile device" 10. The imaging system 18 may comprise image sensors such as, but not limited to, Charge-Coupled Device (CCD) or Complementary Metal Oxide Semiconductor (CMOS) sensors and/or digital cameras. Imaging system 18 may convert an optical image into an electronic or digital image and may send captured images to the computing unit 100. In the same or other embodiments, the imaging system 18 may be a single-lens camera providing RGB pictures. In some embodiments, the device 10 comprises depth sensors to acquire RGB-Depth (RGBD) pictures. Broadly speaking, any device suitable for generating a 3D point cloud may be used as the imaging system 18 including but not limited to depth sensors, 3D scanners or any other suitable devices.

The device 10 may comprise an Inertial Sensing Unit (ISU) 14 configured to be used in part by the computing unit 100 to determine a position of the imaging system 18 and/or the device 10. Therefore, the computing unit 100 may determine a set of coordinates describing the location of the imaging system 18, and thereby the location of the device 10, in a coordinate system based on the output of the ISU 14. Generation of the coordinate system is described hereinafter. The ISU 14 may comprise 3-axis accelerometer(s), 3-axis gyroscope(s), and/or magnetometer(s) and may provide velocity, orientation, and/or other position related information to the computing unit 100.

The ISU 14 may output measured information in synchronization with the capture of each image by the imaging system 18. The ISU 14 may be used to determine the set of coordinates describing the location of the device 10 for each captured image of a series of images. Therefore, each image may be associated with a set of coordinates of the device 10 corresponding to a location of the device 10 when the corresponding image was captured. Furthermore, information provided by the ISU may be used to determine a coordinate system and/or a scale corresponding of the object to be characterized. Other approaches may be used to determine said scale, for instance by including a reference object whose size is known in the captured images, near the object to be characterized.

Further, the device 10 may include a screen or display 16 capable of rendering color images, including 3D images. In some embodiments, the display 16 may be used to display live images captured by the imaging system 18, 3D point clouds, Augmented Reality (AR) images, Graphical User Interfaces (GUIs), program output, etc. In some embodiments, display 16 may comprise and/or be housed with a touchscreen to permit users to input data via some combination of virtual keyboards, icons, menus, or other Graphical User Interfaces (GUIs). In Some embodiments, display 16 may be implemented using a Liquid Crystal Display (LCD) display or a Light Emitting Diode (LED) display, such as an Organic LED (OLED) display. In other embodiments, display 16 may be remotely communicatively connected to the device 10 via a wired or a wireless connection (not shown), so that outputs of the computing unit 100 may be displayed at a location different from the location of the device 10. In this situation, the display 16 may be operationally coupled to, but housed separately from, other functional units and systems in device 10. The device 10 may be, for example, an iPhone® mobile phone from Apple or a Galaxy® mobile phone or tablet from Samsung, or any other mobile device whose features are similar or equivalent to the aforementioned features. The device may be, for example and without being limitative, a handheld computer, a personal digital assistant, a cellular phone, a network device, a camera, a smart phone, an enhanced general packet radio service (EGPRS) mobile phone, a network base station, a media player, a navigation device, an e-mail device, a game console, or a combination of two or more of these data processing devices or other data processing devices.

The device 10 may comprise a memory 12 communicatively connected to the computing unit 100 and configured to store without limitation data, captured images, depth values, sets of coordinates of the device 10, 3D point clouds, and raw data provided by ISU 14 and/or the imaging system 18. The memory 12 may be embedded in the device 10 as in the illustrated embodiment of FIG. 2 or located in an external physical location. The computing unit 100 may be configured to access a content of the memory 12 via a network (not shown) such as a Local Area Network (LAN) and/or a wireless connexion such as a Wireless Local Area Network (WLAN).

The device 10 may also includes a power system (not depicted) for powering the various components. The power system may include a power management system, one or more power sources (e.g., battery, alternating current (AC)), a recharging system, a power failure detection circuit, a power converter or inverter and any other components associated with the generation, management and distribution of power in mobile or non-mobile devices.

As such, in at least some embodiments, the device 10 may also be suitable for generating the 3D point cloud, based on images of the object. Said images may have been captured by the imaging system 18. As an example, the device 10 may generate the 3D point cloud according to the teachings of the Patent Cooperation Treaty Patent Publication No. 2020/240497.

Summarily, it is contemplated that the device 10 may perform the operations and steps of methods described in the present disclosure. More specifically, the device 10 may be suitable for capturing images of the object to be characterized, generating a 3D point cloud including data points and representative of the object, and executing methods for characterization of the 3D point cloud. In at least some embodiments, the device 10 is communicatively connected (e.g. via any wired or wireless communication link including, for example, 4G, LTE, Wi-Fi, or any other suitable connection) to an external computing device 23 (e.g. a server) adapted to perform some or all of the methods for characterization of the 3D point cloud. As such, operation of the computing unit 100 may be shared with the external computing device 23.

In this embodiment, the device 10 accesses the 3D point cloud by retrieving information about the data points of the 3D point cloud from the RAM 130 and/or the memory 12. In some other embodiments, the device 10 accesses a 3D point cloud by receiving information about the data points of the 3D point cloud from the external computing device 23.

Figure 3:
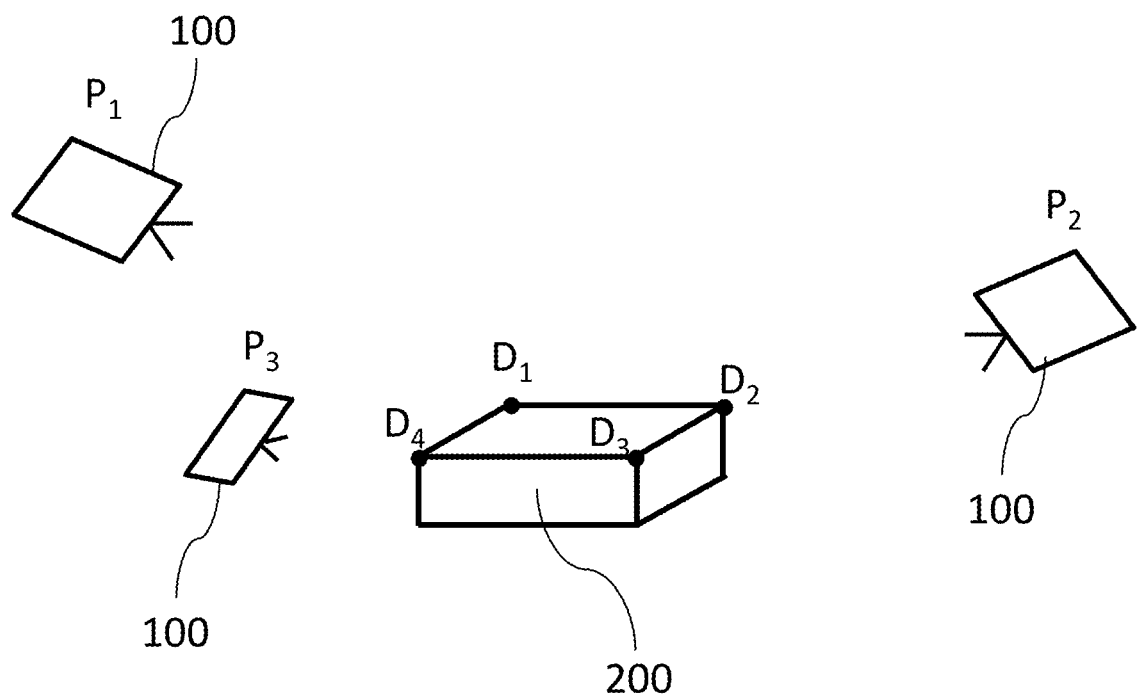
FIG. 3 is a schematic representation of a capture of images of an object according to an embodiment of the present technology.

Referring to FIG. 3, images of an object 200 are captured by a computing unit 100, which may be the same or similar to the device 10 described above with reference to FIG. 2, including the imaging system 18 as described above, each image being captured at a distinct point of view. As an example, three distinct points of view $P_1$, $P_2$ and $P_3$ are illustrated in FIG. 3. The positions of the points of view are determined by the computing unit 100 based, e.g., on data from an inertial sensing unit 14, as described above.

More specifically, a plurality of images (a-n) may be obtained from the imaging system 18, each captured image being associated with information provided by the inertial sensing unit 14 at a time of the capture. In some embodiments, the plurality of images (a-n) forms a series of images captured describing a continuous movement of the imaging system around the object. The plurality of images exists within a global coordinate system (or "world coordinate system"), based on the actual position and orientation of the imaging system 18 during the capture. From the plurality of images (a-n), camera calibrations, intrinsic parameters and extrinsic parameters may be determined using known computer vision algorithms and techniques, such as known Structure-from-Motion (SfM) techniques. An alignment process may be performed to realign and scale the estimated positions of the imaging system 18 in the global coordinate system (position and orientation) using a known RANdom Sampling Consensus (RANSAC) method.

Said alignment may be further refined. In some implementations, this may be done by obtaining a plurality of global coordinate system image pairs, each such image pair including a defined first image (a) and a randomly selected second image (d). A distance is measured between the first image and the second image of the global coordinate system image pairs. Estimated position image pairs are obtained that correspond to the global coordinate system image pairs, and the distance is measured between the corresponding estimated image pairs, ax and dx. In some implementations, six pairs may be used per imaging system, and six different pairs may be randomly generated for each imaging system position in a global coordinate system. In some implementations, refining the alignment further involves obtaining a translation ratio distribution. This may be done by calculating the ratio between each global coordinate system pair distance and each estimated position pair distance—i.e., (global coordinate system distance)$_{a\text{-}d}$/(estimated position distance)$_{ax\text{-}dx}$. Each mean of the distance ratio of the six pairs provides a point in the translation ratio distribution.

Refining the alignment may further involve obtaining the robust median value of the pair distance ratio distribution. In some implementations, this may involve performing a sigma-clipped statistical process at, e.g., 3 sigma, so that outliers that are ≥3 sigma are removed. This robust median value will be a scaling factor. Refining the alignment may further involve applying a robust median value scaling factor. It should be noted that a standard deviation >0.1 may indicate that the global coordinate system positions and the estimated positions are very different, and the scale of the reconstruction has a high probability of error. Additionally, if more than 22% of the positions are considered outliers in the translation ratio distribution, then scaling issues are highly probable. Refining the alignment may further involve performing a known iterative corresponding points (ICP) algorithm to refine the alignment between the global coordinate system image positions and the estimated positions <3 sigma.

In this embodiment, position and orientation of the imaging system 18 may by used by known augmented reality libraries such as, without limitation, ARKit™ from APPLE™ or ARCore™ from GOOGLE™ to generate the 3D point cloud or data points thereof.

Figure 4:
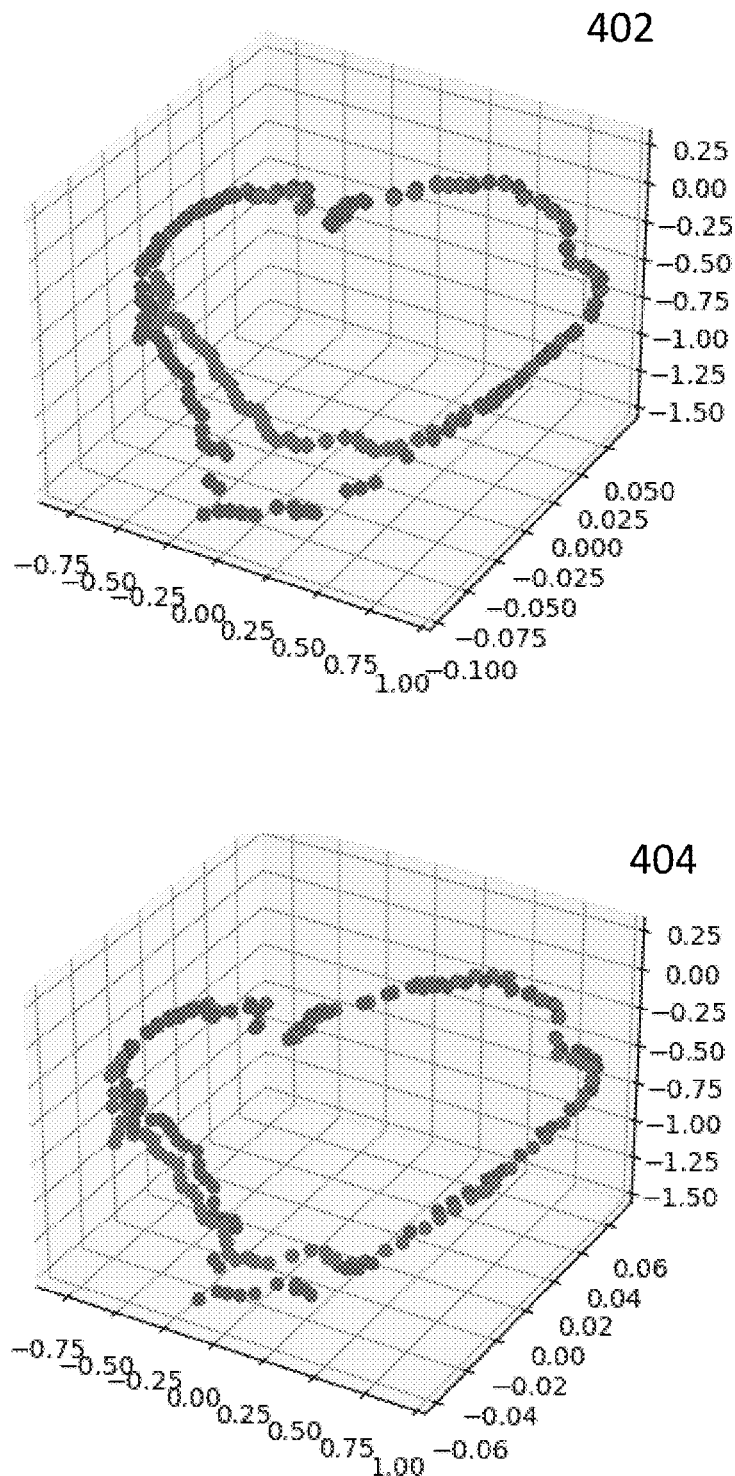
FIG. 4 shows an example of an alignment between global coordinate system image positions and estimated positions before and after application of an iterative corresponding points (ICP) algorithm in accordance with the disclosed technology.

FIG. 4 shows an example of an alignment 402 between world coordinate system image positions and estimated positions before application of an ICP algorithm, and an alignment 404 between world coordinate system image positions and estimated positions after application of the ICP algorithm.

In this embodiment, 3D coordinates of a given point of view in a global coordinate system are associated with the corresponding image capture at said point of view. As such, each captured image is associated with feature data (or "metadata") including information about a position of the corresponding point of view.

In this embodiment, the computing unit 100 uses MLA and/or Augmented Reality techniques to detect and track feature points of the object 200 in the captured images, each feature point of the object being identified by a unique identifier. Broadly speaking, the definition of the feature points of the object may depend on a type of object, an application of the 3D point cloud generation, and the MLA and/or Augmented Reality techniques used. In some embodiments, the feature points may be regions of interest and comprise a plurality of points of the object. As an example, FIG. 3 illustrates the object 200 having four identified feature points $D_1$, $D_2$, $D_3$ and $D_4$.

In this embodiment, the computing unit 100 in collaboration with the imaging system 18 and the inertial sensing unit 14 determines 3D coordinates of the feature points for each captured image and based at least on said capture image. As such, a list of sets of 3D coordinates is associated with each feature points, each set of 3D coordinates corresponding to one captured image of the object 200.

In at least one embodiment, data points of the 3D point cloud may have been generated by known augmented reality libraries such as, without limitation, ARKit™ from APPLE™ or ARCore™ from GOOGLE™. For example, data points may be generated in the 3D point cloud by said augmented reality libraries based on sets of 2D coordinates associated with one feature point. As will be described in greater details hereinafter, a reprojection process is executed on the data points of the 3D point cloud to determine potential errors in the generation of the data points.

As such, with reference to FIG. 5, each feature point is associated with a list of sets of 2D coordinates, each entry of said list being indicative of a position of an image of the corresponding feature point on a 2D plane of one of the captured images. In other words, each captured image extends along a 2D plane and is defined on a pixel range corresponding to an area of the 2D plane. More specifically, each feature point may appear in one of the images as a dot (or pixel in a digital image). In the illustrative example of FIG. 5, an image of the feature point $D_1$ on the image $I_1$ is $\tilde{D}_{11}$ having a set of 2D coordinates $(\tilde{x}_{11}, \tilde{y}_{11})$, an image of the feature point $D_1$ on the image $I_2$ is $\tilde{D}_{21}$ having a set of 2D coordinates $(\tilde{x}_{21}, \tilde{y}_{21})$, and an image of the feature point $D_1$ on the image $I_3$ is $\tilde{D}_{31}$ having a set of 2D coordinates $(\tilde{x}_{31}, \tilde{y}_{31})$. In a similar manner, images of the feature point $D_2$ on images $I_1$, $I_2$ and $I_3$ are respectively $\tilde{D}_{12}(\tilde{x}_{12}, \tilde{y}_{12})$, $\tilde{D}_{22}(\tilde{x}_{22}, \tilde{y}_{22})$ and $\tilde{D}_{32}(\tilde{x}_{32}, \tilde{y}_{32})$. Similarly, images of the feature point $D_3$ on images $I_1$, $I_2$ and $I_3$ are respectively $\tilde{D}_{13}(\tilde{x}_{13}, \tilde{y}_{13})$, $\tilde{D}_{23}(\tilde{x}_{23}, \tilde{y}_{23})$ and $\tilde{D}_{33}(\tilde{x}_{33}, \tilde{y}_{33})$. Finally, images of the feature point $D_4$ on images $I_1$, and $I_2$ are respectively $\tilde{D}_{14}(\tilde{x}_{14}, \tilde{y}_{14})$, and $\tilde{D}_{24}(\tilde{x}_{24}, \tilde{y}_{24})$.

In one embodiment, the feature data of an image further comprises information about feature data points visible in said image (i.e., sets of 3D coordinates of the feature data points and/or sets of 2D coordinates of images of the feature data points).

Based on said images $\tilde{D}_{ij}$ of the feature points, data points of the point cloud may be generated by the aforementioned known augmented reality libraries such as, without limitation, ARKit™ from APPLE™ or ARCore™ from GOOGLE™. As such, each feature point is further associated with a set of 3D coordinates for each image $I_1$, $I_2$ and $I_3$, the images $I_1$, $I_2$ and $I_3$ having been respectively captured from the points of view $P_1$, $P_2$ and $P_3$. It can thus be said that each feature point is represented by a plurality of feature data points in the 3D point cloud, each feature data point corresponding to one of the captured images.

More specifically, the feature point $D_1$ is represented by a feature data point $D_{11}$ in the 3D space, $D_{11}$ having a set of 3D coordinates $(x_{11}, y_{11}, z_{11})$ and being associated with the image $I_1$. $D_1$ is also represented by a feature data point $D_{21}$ having a set of 3D coordinates $(x_{21}, y_{21}, z_{21})$ associated with the image $I_2$. $D_1$ is further represented by a feature data point $D_{31}$ having a set of 3D coordinates $(x_{31}, y_{31}, z_{31})$ associated with the image $I_3$.

In a similar manner, the feature point $D_2$ is represented by a feature data point $Du$ having a set of 3D coordinates $(x_{12}, y_{12}, z_{12})$ associated with the image $I_1$, by a feature data point $D_{22}$ having a set of 3D coordinates $(x_{22}, y_{22}, z_{22})$ associated with the image $I_2$, and by a feature data point $D_{32}$ having a set of 3D coordinates $(x_{32}, y_{32}, z_{32})$ associated with the image $I_3$. Similarly, the feature point $D_3$ is represented by a feature data point $D_{13}$ having a set of 3D coordinates $(x_{13}, y_{13}, z_{13})$ associated with the image $I_1$, by a feature data point $D_{23}$ having a set of 3D coordinates $(x_{23}, y_{23}, z_{23})$ associated with the image $I_2$, and by a feature data point $D_{33}$ having a set of 3D coordinates $(x_{33}, y_{33}, z_{33})$ associated with the image $I_3$. Finally, the feature point $D_4$ is represented by a feature data point $D_{14}$ having a set of 3D coordinates $(x_{14}, y_{14}, z_{14})$ associated with the image $I_1$, and by a feature data point $D_{24}$ having a set of 3D coordinates $(x_{24}, y_{24}, z_{24})$ associated with the image $I_2$. In this illustrative example, the feature point $D_4$ has no set of 3D coordinates associated with the third image $I_3$ (e.g. the feature point $D_4$ is not visible on the image $I_3$). The list of sets of 3D coordinates for each feature point may be stored in the memory 12 of the device 10. It can thus be said that that 3D point cloud comprises data points, some of those data points being feature data points associated with an identifier and representing a position of a feature point of the object, the position being associated with one capture image.

Generation of feature data points $Du$ may be an error-prone operation due to a plurality of factors such that quality of the captured images, a number of captured images and a number of feature points of the object to be characterized. As such, the present disclosure describes a reprojection process to assess quality of the generated data points of the 3D point cloud. Said quality is inherently associated with a robustness of the feature points of the object to be characterized. Indeed, if a given feature point is not visible in a relatively high amount of captured images, data points generated to represent said feature points are more likely to be of a lower quality.

Figure 6:
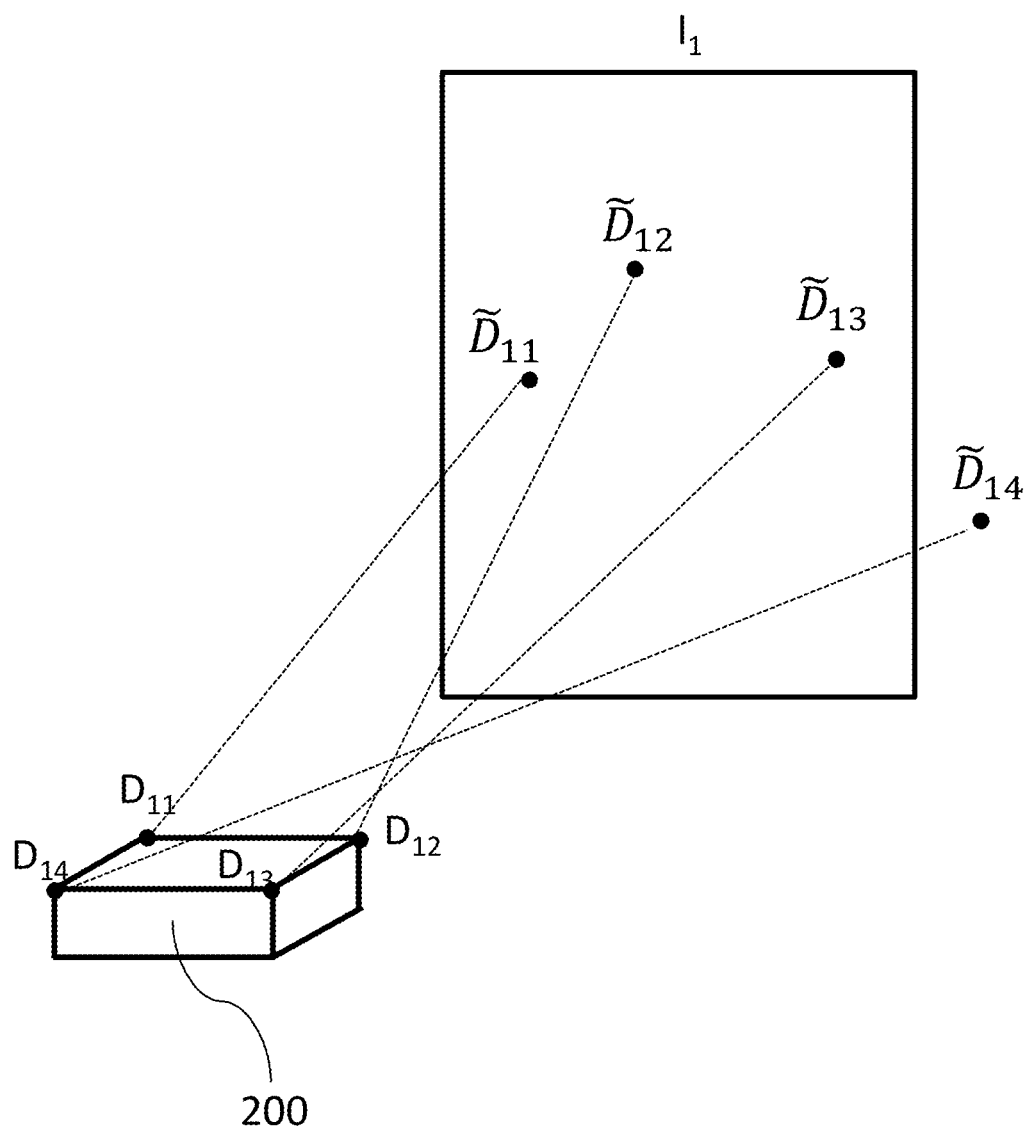
FIG. 6 is a schematic representation of a projection of feature data points onto a 2D plane of an image associated with said feature data points.

FIG. 6 illustrates a procedure to determine robust feature points among the previously identified feature points. In this embodiment, an imaging transfer function is determined to perform projection of the 3D coordinates of the feature points on the 2D plane of each image. The imaging transfer function is a mathematical transformation based on extrinsic and intrinsic parameters of the imaging device 18 to account for the distance between the point of view of the corresponding image and the object 200, a field of view of the imaging device 18, image distortion parameters, etc. As such, for each set of 3D coordinates of a feature point and for each captured image (i.e., for each feature data point), a 2D projection of the set of 3D coordinates in the 2D plane of the captured image is determined based on the imaging transfer function.

As an example, FIG. 6 illustrates projections of the feature data points $D_{11}$, $D_{12}$, $D_{13}$ and $D_{14}$ on the image $I_1$. More specifically, the sets of 3D coordinates of the feature data points $D_{11}$, $D_{12}$, $D_{13}$ and $D_{14}$ are projected in the 2D plane of the image $I_1$ by using the imaging transfer function. For example, the set of 3D coordinates of $D_{11}$ associated with the capture image $I_1$ (i.e., $(x_{11}, y_{11}, z_{11})$) gives the point $\tilde{D}_{11}$ having set of projected 2D coordinates $(\tilde{x}_{11}, \tilde{y}_{11})$.

Such projection of feature data points is performed on each corresponding captured image. More specifically, the feature data points corresponding to a given captured image are projected onto said captured image. The imaging transfer function may be adjusted for each captured image, and further determine projected 2D coordinates for each set of 3D coordinates of the feature point associated with said captured image.

Referring to the illustrative example of FIG. 6, the projection of the feature data points $D_{11}$, $D_{12}$ and $D_{13}$ fall onto a pixel range of the image $I_1$. Some projections may fall outside the pixel range of the image. For example, the projection $\tilde{D}_{14}$ of $D_{14}$ by the imaging transfer function falls outside the pixel range of the captured image $I_1$. A robustness of feature points having a set of 3D coordinates projected outside the pixel range of the corresponding captured image is decreased. For example, each feature point may be associated with robustness score. The robustness score of a given feature point may further be decreased in response to one of the associated set of 3D coordinates is projected by the imaging transfer function outside the pixel range of the captured image corresponding to said set of 3D coordinates.

If determination is made that the robustness score of a feature point is below a threshold, said feature point is discarded from the 3D point cloud, namely all the data points being identified as the feature point are removed from the 3D point cloud. The feature point having a robustness score above the threshold are referred to as "robust feature points". In one embodiment, the threshold may depend on the total number of captured images, a frame rate (i.e. number of images captured in a given interval of time), or a density of the 3D point cloud. It can also be said that low quality data points (e.g. whose projection by the imaging transfer function falls outside the pixel range of the corresponding captured image) reduces robustness of the corresponding feature points.

In this embodiment, the computing unit 100 further generates, for each robust feature point, a median feature point based on the list of sets of 3D coordinates of said robust feature point, 3D coordinates of said median feature point being a median of said sets of 3D coordinates. In other words, a median feature point is a median of the feature data points having the same identifier and corresponding to the same robust feature point. For example, if determination is made that $D_1$ is a robust feature point, a corresponding median feature point is generated, 3D coordinates of said median feature point being a median of the 3D coordinates of the list of sets of 3D coordinates associated with $D_1$. In other words, a median data point is generated from a plurality of data points of the 3D point cloud having a same identifier, said identifier corresponding to a robust feature point. In alternative embodiments, the median feature points are determined based on means of the corresponding sets of 3D coordinates of the feature points, and are thus referred to as "mean feature points".

The data points corresponding to the 3D coordinates in the lists of sets of 3D coordinates may be further discarded from the 3D point cloud, such that each of the feature points of the object 200 is represented by a single corresponding median feature point in the 3D point cloud. As such, imprecisions due to the drifting effect on the feature points are at least partly outweighed.

In the same or another embodiment, the capture images (e.g., $I_1$, $I_2$ and $I_3$) are colored images. For example, each data points of the 3D point cloud may thus have a color associated thereto, in the form of a vector. The vector may comprise coordinates of the color in the Red-Green-Blue (RGB) color space, or any other color space (e.g., Hue-Saturation-Lightness color space). The median feature points are colored with an average color of the data points corresponding to their respective feature points. The average color may be determined based on a median value of the colors of the corresponding data points, a mean value, or any other suitable average value.

Figure 7:
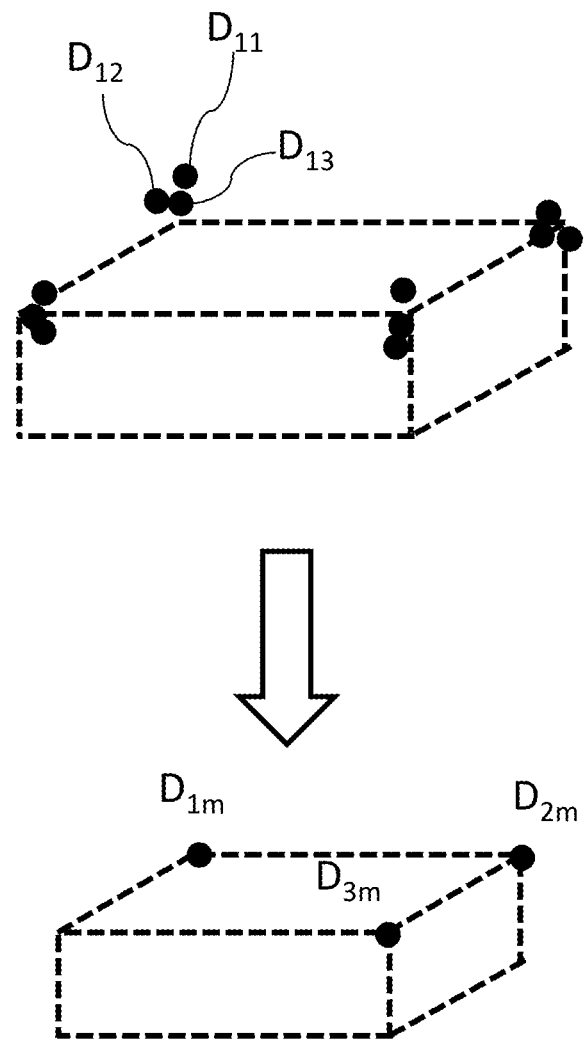
FIG. 7 is a schematic representation of a process for generating median feature points in the 3D point cloud.

As an example, FIG. 7 illustrates data points corresponding to each of feature points $D_1$, $D_2$, $D_3$ and $D_4$. If a determination is made that $D_4$ is not robust, no median feature point is generated for the feature point $D_4$. If a determination is made that $D_1$, $D_2$ and $D_3$ are robust feature points, the median feature points $D_{1m}$, $D_{2m}$, $D_{3m}$ are respectively generated. Taking $D_1$ as an example, $D_{1m}$ is generated based on a median of the feature data points $D_{11}$, $D_{12}$, $D_{13}$. Furthermore, a color of $D_{1m}$ is determined based on a median of the colors of the feature data points $D_{11}$, $D_{12}$, $D_{13}$.

Figure 8:
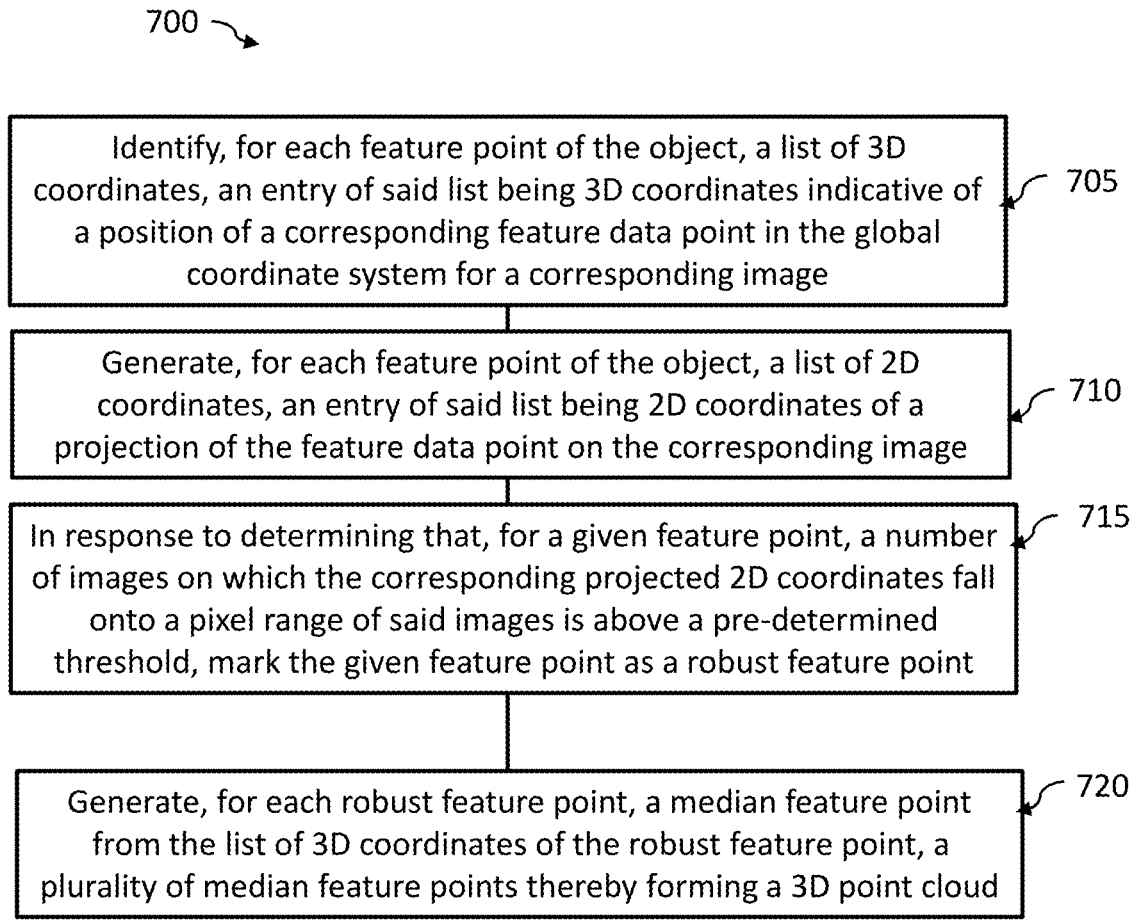
FIG. 8 illustrates a flow diagram showing operations of a method for generating data points in a 3D point cloud from a plurality of images of an object.

FIG. 8 is a flow diagram of a computer-implemented method 700 for generating data points in a 3D point cloud generated from a plurality of images of an object, according to some embodiments of the present technology. In one or more aspects, the method 700 or one or more steps thereof may be performed by a computer system, such as the computer system 100, discussed above with reference to FIG. 3. The method 700, or one or more steps thereof, may be embodied in computer-executable instructions that are stored in a computer-readable medium, such as a non-transitory mass storage device, loaded into memory and executed by a CPU. Some steps or portions of steps in the flow diagram may be omitted or changed in order.

In this embodiment, the 3D point cloud may have been captured according to the techniques disclosed above (e.g. with reference to FIG. 3). More specifically, a plurality of images of the object have been captured, each image having been captured by an imaging mobile device (e.g. the imaging system 18) from a corresponding point of view, each image being associated with feature data, the feature data including information about 3D coordinates of the corresponding point of view in a global coordinate system, and 3D coordinates of a set of feature points of the object in the global coordinate system. Additionally, the feature data points are associated with identifiers such that at least one feature point is identified on at least two distinct images by at least two corresponding feature data points.

The method begins with identifying, at 705, for each feature point of the object, a list of 3D coordinates, an entry of said list being 3D coordinates indicative of a position of a corresponding feature data point in the global coordinate system for a corresponding captured image. The feature points of the object may be detected, identified and/or tracked by using MLA and/or Augmented Reality techniques.

The method 700 continues with generating, at 710 and for each feature point of the object, a list of 2D coordinates, an entry of said list being 2D coordinates of a projection of the feature data point on the corresponding image. In this embodiment, said projection involves applying an imaging transfer function to the sets of 3D coordinates to obtain corresponding sets of 2D coordinates. The imaging transfer function is a mathematical transformation based on extrinsic and intrinsic parameters of the imaging device to account for the distance between the point of view of the corresponding image and the object, a field of view of the imaging device, image distortion parameters, etc. As such, for each set of 3D coordinates of a feature point and for each captured image (i.e. for each feature data point), a 2D projection of the set of 3D coordinates in the 2D plane of the captured image is determined using the imaging transfer function.

The method 700 continues with marking, at 715, a feature point as a robust feature point in response to determining that, for said feature point, a number of images on which the corresponding projected 2D coordinates fall onto a pixel range of said images is above a pre-determined threshold. In this embodiment, the threshold may depend on the total number of captured images, a frame rate (i.e. number of images captured in a given interval of time), or a density of the 3D point cloud.

The method 700 continues with generating, at 720, a median feature point for each robust feature point and from the list of 3D coordinates of the robust feature point. A plurality of median feature points, thereby forming new data points in the 3D point cloud.

In this embodiment, 3D coordinates of a given median feature point are a median of sets of 3D coordinates of the corresponding feature data points. In other words, a median feature point is a median of the feature data points having the same identifier and corresponding to the same robust feature point.

In one embodiment, the plurality of images is a plurality of colored images, the feature data of a given image further including information about colors of the feature data points in a color space. As such, a list of colors is determined for each feature point of the object, an entry of said list being color coordinates in the color space of the feature point for a given colored image. The color space may be, for example, the Red-Green-Blue (RGB) space. The median feature point may be colored with an average of colors of the corresponding list of colors.

In another aspect, the present technology provides a process for removing noise from a 3D point cloud to extract data points representative of an object from data points representative of a scene around the object. For a given 3D point cloud obtained by the device 10 and processed with the method 700, it can be said that the object has been at least partly denoised, given that data points generated due to the drifting effect have been removed from the 3D point cloud, and the feature points of the object are represented by single median feature points in the 3D point cloud.

In at least one embodiment, the 3D point cloud may be down-sampled to reduce a computation time of the following techniques.

Figure 9:
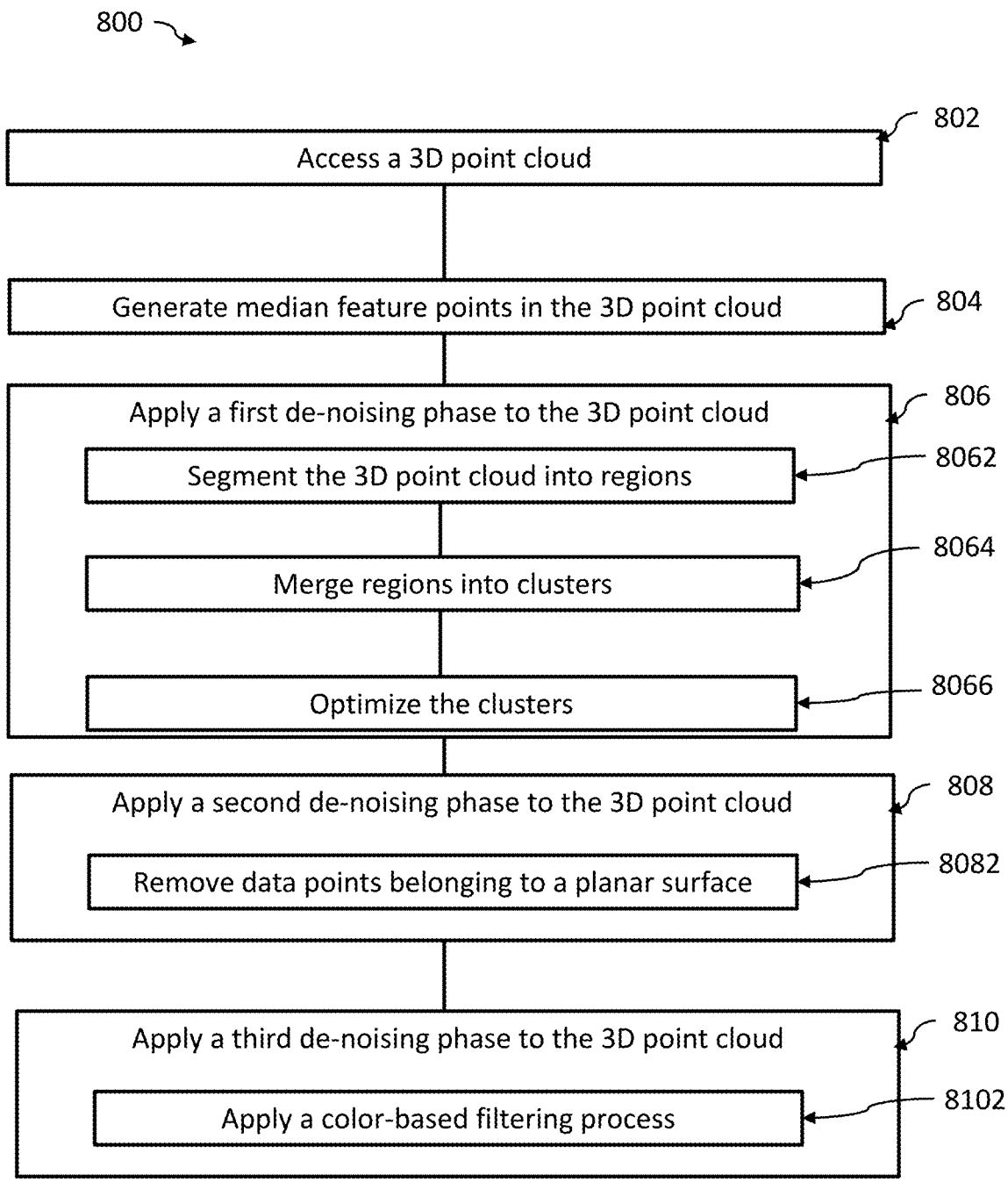
FIG. 9 illustrates a flow diagram showing operations of a method for removing noise from a 3D point cloud.

Referring to FIG. 9, an overview 800 of a noise removing computer-implemented method is described in accordance with one embodiment of the present technology. It will be understood that this implementation may include code that is executed in a computing environment such as is shown in FIG. 2, and/or may include specialized circuitry.

At 802, a 3D point cloud is accessed. As used herein, a point cloud, or 3D point cloud reconstruction, may refer to a simple 3D representation of an object where the vertices are not necessarily connected to each other. If they are not connected to each other, the information contained in this kind of representation is the coordinates (e.g., x, y, z in the case of a cartesian coordinate system) of each vertex, and its color (e.g., r, g, b). The 3D point cloud reconstruction may be the result of 3D scanning, and a common format for storing such point clouds is the Polygon File Format (PLY).

In this embodiment, the 3D point cloud including feature data points representing feature points of the object, said feature data points associated being with identifiers, a plurality of feature data points having a same identifier corresponding to a same point of the object at different locations in the global coordinate system. At 804, steps of the method 700 may be applied to the 3D point cloud to generate the median feature points and remove the feature data points of the 3D point cloud, such that the object to be extracted is at least partly denoised.

At 806, a first de-noising phase is applied. In this embodiment, the first de-noising phase includes a clustering process. A largest cluster is determined by applying a density-based spatial clustering method. Said method may be a density-based spatial clustering of application with noise (DBSCAN) algorithm or any other suitable algorithm.

In one embodiment, the clustering process includes a first segmentation process 8062, which uses geometric-based region growing techniques to segment the point cloud into regions. A second segmentation process 8064 uses color-based region growing to segment the point cloud into color-based regions. A cluster-of-interest process 8066 merges regions into clusters and identifies clusters-of-interest. The first de-noising phase also includes a cluster optimization process 8068 that uses statistical outlier filtering to obtain "optimized" data clusters.

At 808, a second de-noising phase is applied to identify a planar surface in the 3D point cloud and remove data points associated with the planar surface from the 3D point cloud. The planar surface may be, for example, a flat surface on which an object of interest is resting and is identified as being perpendicular to a reference axis. In other words, the second de-noising phase involves both macro removal of a planar surface beneath/adjacent to an object or on which an object is resting, as well as fine de-noising, employing color filtering (by any color space know by the skilled person) to remove the points with similar color values and normal direction to the planar surface that has been removed.

In some embodiments, the reference axis is determined at step 808. The reference axis may be a gravity-oriented axis having an orientation determined based on information provided by, for example and without limitation, the inertial sensing unit 14. In some other embodiments, the computing unit 100 may identify a largest planar surface in the captured image based on MLA and/or Augmented reality techniques. The reference axis may further be defined orthogonally to said largest planar surface. The reference axis may be defined differently in alternative embodiments. Definition of the reference axis may depend on an application of the method 800, a type of the object to be extracted, a configuration of the device 100, a number of captured images and/or other parameters of the 3D point cloud.

A size of the largest cluster of data points along the reference axis is further determined, thereby defining a minimum ordinate $Z_{min}$ and a maximum ordinate Z. of the largest cluster on the reference axis. In this embodiment, a bounding box is defined around the largest cluster, a lower boundary $U_{min}$ of the bounding box being set to the minimum boundary, an upper boundary $U_{max}$ of the bounding box being defined based on the following equation: $Z_{max} = (Z_{max} - Z_{min})R - Z_{min}$, where R is a pre-determined ratio that is, in this non-limiting example, set between 0.2 and 0.3. The value of the ratio R may depend on prior knowledge which may include, but is not limited to, the desired use-case, a specified dimension of the object-of-interest and/or the density of the 3D point cloud. A first dimension of the bounding box is thus set along a direction of the reference axis. The two other dimensions of the bounding box are defined by the largest cluster obtained using the density-based spatial clustering method described hereinabove.

The bounding box is further applied to the 3D point cloud, thereby defining a bounded section of the 3D point cloud located within the bounding box.

At step 8082, data points identified as belonging to a surface perpendicular to the reference axis are removed. More specifically, normal vectors of data points are determined within the bounding section. Determining said normal vectors may require generating a meshed surface from the data points, the normal vector of a given data points being orthogonal to the meshed surface in said data point. Data points having their normal vector within a predetermined threshold angle of the gravity axis. In some implementations, said threshold angle may be, e.g., 20°.

In one embodiment, color information of the data points removed at step 8082 is stored (e.g. in the memory 12). For clarity of the present disclosure, data points that have been removed from the 3D point cloud at step 8082 (i.e. that have their normal vector below the predetermined threshold angle) are referred to as "planar surface data points".

From said color information, two vectors are generated: $H_{planar\text{-}surface\_data\_points}$ (or "hue vector") including hue values of the color of the planar surface data points; and $S_{planar\text{-}surface\_data\_points}$ (or "saturation vector") including saturation values of the color of the planar surface data points.

While the process is described below for an HSV color space, it will be understood that an RGB color space, or any other color space known in the art could be used.

At 810, a third de-noising phase is applied, the third de-noising phase including applying a color-based filtering process to the 3D point to remove data points based on their corresponding color information. More specifically, at step 8102, the median absolute value of each vector is determined to remove noisy values therefrom, resulting in two denoised vectors: $H'_{planar\text{-}surface\_data\_points}$ and $S'_{planar\text{-}surface\_data\_points}$. In this embodiment, removing noisy values may be achieved using the following pseudo-algorithm:

---
INPUT: $H_{planar\text{-}surface\_data\_points}$, threshold m
OUTPUT: $H'_{planar\text{-}surface\_data\_points}$
M = median of $H_{planar\text{-}surface\_data\_points}$
$H_{abs\_dev}$ = vector of absolute deviation values between each value of $H_{planar\text{-}surface\_data\_points}$ and M
M' = median of $H_{abs\_dev}$
R = vector of ratios between each absolute deviation values and M'
Removing values of $H_{planar\text{-}surface\_data\_points}$ having their corresponding ratios above m
---

The same pseudo-algorithm may be applied to $S_{planar\text{-}surface\_data\_points}$. The minimum and maximum values of $H'_{planar\text{-}surface\_data\_points}$ and $S'_{planar\text{-}surface\_data\_points}$ are identified. The color information (hue value and saturation value) of each data points is identified, and data points having their hue value between the minimum and maximum values of $H'_{planar\text{-}surface\_data\_points}$, and their saturation value between the minimum and maximum values of $S'_{planar\text{-}surface\_data\_points}$ are removed from the point cloud. As such, it can be said that said color-based filtering removes data points from the 3D point cloud having distance between their color coordinates and color coordinates of an average color (e.g. median color in this example) of the points associated with the planar surface below a threshold. The threshold is, in this example, based on the minimum and maximum values of $H'_{planar\text{-}surface\_data\_points}$ and $S'_{planar\text{-}surface\_data\_points}$. The threshold is thus based on variation of color along the planar surface.

It will be understood that other values could be used in various implementations, depending on the color space and the range of values for each color in the color space. In general, a goal is to avoid (to the extent possible) inadvertent removal of points on the object of interest.

It will be understood that the features and examples above are not meant to limit the scope of the present disclosure to a single implementation, as other implementations are possible by way of interchange of some or all of the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific implementations so fully reveals the general nature of the disclosure that others can, by applying knowledge within the skill of the relevant art(s) (including the contents of any documents cited and incorporated by reference herein), readily modify and/or adapt for various applications such specific implementations, without undue experimentation and without departing from the general concept of the present disclosure. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While the above-described implementations have been described and shown with reference to particular steps performed in a particular order, it will be understood that these steps may be combined, sub-divided, or re-ordered without departing from the teachings of the present technology. The steps may be executed in parallel or in series. Accordingly, the order and grouping of the steps is not a limitation of the present technology.

While various implementations of the present disclosure have been described above, it should be understood that they have been presented by way of example, and not limitation. It would be apparent to one skilled in the relevant art(s) that various changes in form and detail could be made therein without departing from the spirit and scope of the disclosure. Thus, the present disclosure should not be limited by any of the above-described implementations but should be defined only in accordance with the following claims and their equivalents.

What is claimed is:

1. A computer-implemented method for generating data points in a 3D point cloud from a plurality of images of an object, each image having been captured by an imaging mobile device from a corresponding point of view, each image being associated with feature data, the feature data comprising information about 3D coordinates of the corresponding point of view in a global coordinate system, 3D coordinates of a set of feature points of the object in the global coordinate system, the features points of the object being represented by feature data points in the 3D point cloud, the feature data points being associated with identifiers such that at least one feature point is identified on at least two distinct images by at least two corresponding feature data points, the method comprising:
   identifying, for each feature point of the object, a list of 3D coordinates, an entry of said list being 3D coordinates indicative of a position of a corresponding feature data point in the global coordinate system for a corresponding image;

generating, for each feature point of the object, based on the 3D coordinates for the feature point, projected 2D coordinates for each image of the plurality of images;

determining whether each of the projected 2D coordinates is within the corresponding image;

determining, for each of the feature points, an amount of images in which the corresponding projected 2D coordinates are within the corresponding image;

marking a feature point as a robust feature point after determining that the amount of images containing the feature point in which the projected 2D coordinates are within the image is above a pre-determined threshold; and generating, for each robust feature point, a median feature point from the list of 3D coordinates of the robust feature point, a plurality of median feature points thereby forming new data points in the 3D point cloud.

2. The method of claim 1, wherein the plurality of images is a plurality of colored images, the feature data of a given image further comprises information about colors of the feature data points in a color space, and identifying, for each feature point of the object, the list of 3D coordinates comprises identifying, for each feature point of the object, a list of colors, an entry of said list being color coordinates in the color space of the feature point for a given colored image.

3. The method of claim 2, wherein the color space is a Red-Green-Blue (RGB) space.

4. The method of claim 2, wherein a median feature point is colored with an average of colors of the list of colors.

5. The method of claim 1, wherein the pre-determined threshold is based on a number of images in the plurality of images, a frame rate of the imaging mobile device, and/or a density of the feature points in the global coordinate system.

6. The method of claim 1, wherein the feature points of the object are determined based on augmented reality techniques.

7. The method of claim 1, wherein generating, for each feature point of the object, the projected 2D coordinates comprises applying a transfer function to the 3D coordinates corresponding to said feature point for each image, the transfer function being based on extrinsic or intrinsic parameters of the imaging mobile device.

8. A computer-implemented method for removing noise from a 3D point cloud, the 3D point cloud being a representation of an object in a global coordinate system, the 3D point cloud having been generated from a plurality of images of the object, each image having been captured by an imaging mobile device from a corresponding point of view, the method comprising:

accessing the 3D point cloud, the 3D point cloud comprising feature data points associated with identifiers, a plurality of feature data points having a same identifier corresponding to a same feature point of the object at different locations in the global coordinate system;

generating median feature points according to the method of claim 1;

replacing the feature data points from the 3D point cloud with the median feature points;

applying a first de-noising phase to the 3D point cloud, the first de-noising phase comprising:

segmenting the 3D point cloud into regions;

merging regions into clusters; and optimizing the clusters by removing points that are statistical outliers to a cluster from the 3D point cloud;

applying a second de-noising phase to the 3D point cloud, the second de-noising phase identifying a planar surface in the 3D point cloud and removing points associated with the planar surface from the 3D point cloud, the planar surface being perpendicular to a reference axis; and applying a third de-noising phase to the 3D point cloud, the third de-noising phase removing delocalized noise associated with the planar surface from the 3D point cloud.

9. The method of claim 8, wherein the reference axis is a gravity-oriented axis.

10. The method of claim 8, wherein removing points associated with the planar surface from the 3D point cloud comprises:

identifying points of the 3D point cloud having a corresponding normal vector forming an angle below a first pre-determined threshold with the reference axis; and removing said identified points.

11. The method of claim 8, wherein the third de-noising phase uses color-based filtering to remove delocalized noise associated with the planar surface.

12. The method of claim 11, wherein the color-based filtering removes data points from the 3D point cloud having distance between their color coordinates and color coordinates of an average color of the points associated with the planar surface below a second threshold.

13. The method of claim 12, wherein the second threshold is based on variation of color along the planar surface.

14. A computer-implemented system configured to perform the method of claim 8.

15. A non-transitory computer-readable medium comprising computer-executable instructions that cause a system to execute the method according to claim 8.

16. A non-transitory computer-readable medium comprising computer-executable instructions that cause a system to execute the method according to claim 1.

17. A system comprising:

one or more processors; and one or more memories comprising instructions that, when executed by the one or more processors, cause the one or more processors to perform a method for generating data points in a 3D point cloud from a plurality of images of an object, each image having been captured by an imaging mobile device from a corresponding point of view, each image being associated with feature data, the feature data comprising information about 3D coordinates of the corresponding point of view in a global coordinate system, 3D coordinates of a set of feature points of the object in the global coordinate system, the features points of the object being represented by feature data points in the 3D point cloud, the feature data points being associated with identifiers such that at least one feature point is identified on at least two distinct images by at least two corresponding feature data points, the method comprising:

identifying, for each feature point of the object, a list of 3D coordinates, an entry of said list being 3D coordinates indicative of a position of a corresponding feature data point in the global coordinate system for a corresponding image;

generating, for each feature point of the object, based on the 3D coordinates for the feature point, projected 2D coordinates for each image of the plurality of images;

determining whether each of the projected 2D coordinates is within the corresponding image;

determining, for each of the feature points, an amount of images in which the corresponding projected 2D coordinates are within the corresponding image;

marking a feature point as a robust feature point after determining that the amount of images containing the feature point in which the projected 2D coordinates are within the image is above a pre-determined threshold; and generating, for each robust feature point, a median feature point from the list of 3D coordinates of the robust feature point, a plurality of median feature points thereby forming new data points in the 3D point cloud.

18. The system of claim 17, wherein the plurality of images is a plurality of colored images, the feature data of a given image further comprises information about colors of the feature data points in a color space, and identifying, for each feature point of the object, the list of 3D coordinates comprises identifying, for each feature point of the object, a list of colors, an entry of said list being color coordinates in the color space of the feature point for a given colored image.

19. The system of claim 17, wherein the pre-determined threshold is based on a number of images in the plurality of images, a frame rate of the imaging mobile device, and/or a density of the feature points in the global coordinate system.

20. The system of claim 17, wherein generating, for each feature point of the object, a list of 2D coordinates comprises applying a transfer function to the 3D coordinates corresponding to said feature point for each image, the transfer function being based on extrinsic or intrinsic parameters of the imaging mobile device.

* * * * *